United States Patent
Jansen dos Reis

(10) Patent No.: US 12,309,344 B2
(45) Date of Patent: *May 20, 2025

(54) ELECTRONIC DEVICE THAT DISPLAYS VIRTUAL OBJECTS AT DIFFERENT APPARENT DEPTHS

(71) Applicant: Apple Inc., Cupertino, CA (US)

(72) Inventor: Paulo R Jansen dos Reis, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,386

(22) Filed: May 29, 2024

(65) Prior Publication Data

US 2024/0314281 A1    Sep. 19, 2024

Related U.S. Application Data

(63) Continuation of application No. 18/295,353, filed on Apr. 4, 2023, now Pat. No. 12,058,301.

(60) Provisional application No. 63/348,897, filed on Jun. 3, 2022.

(51) Int. Cl.
*H04N 13/128* (2018.01)
*H04N 13/344* (2018.01)

(52) U.S. Cl.
CPC ......... *H04N 13/128* (2018.05); *H04N 13/344* (2018.05)

(58) Field of Classification Search
CPC .................. H04N 13/128; H04N 13/344
See application file for complete search history.

(56) References Cited

U.S. PATENT DOCUMENTS

| | | | |
|---|---|---|---|
| 9,367,960 B2 | 6/2016 | Poulos et al. | |
| 10,754,496 B2 | 8/2020 | Kiemele et al. | |
| 11,049,328 B2 | 6/2021 | Powderly et al. | |
| 11,112,863 B2 | 9/2021 | Miller et al. | |
| 11,205,308 B1 | 12/2021 | Chen et al. | |
| 12,058,301 B2 * | 8/2024 | Jansen dos Reis | G06F 3/011 |
| 2015/0312561 A1 | 10/2015 | Hoof et al. | |
| 2019/0172262 A1 | 6/2019 | McHugh et al. | |
| 2019/0362557 A1 | 11/2019 | Lacey et al. | |
| 2020/0371673 A1 | 11/2020 | Faulkner | |
| 2021/0192802 A1 * | 6/2021 | Nepveu | G06F 3/165 |
| 2022/0108508 A1 * | 4/2022 | Mirhosseini | G06T 7/246 |

FOREIGN PATENT DOCUMENTS

JP    H11202256 A    7/1999

* cited by examiner

*Primary Examiner* — Afroza Chowdhury
(74) *Attorney, Agent, or Firm* — Treyz Law Group, P.C.; Joseph F. Guihan

(57) ABSTRACT

An electronic device may include one or more sensors and one or more displays. The display may be configured to display virtual objects of various types. The electronic device may receive a request to display a first type of virtual object that has a location defined relative to a location corresponding to the electronic device or a user of the electronic device. In response to the request to display the first type of virtual object, the electronic device may determine a depth of an object that is aligned with a target display direction for the virtual object, determine an apparent depth at which to display the virtual object based on at least the depth of the object, and display, via the one or more displays, the virtual object at the apparent depth.

21 Claims, 6 Drawing Sheets

ELECTRONIC DEVICE THAT DISPLAYS VIRTUAL OBJECTS AT DIFFERENT APPARENT DEPTHS

This application is a continuation of U.S. non-provisional patent application Ser. No. 18/295,353, filed Apr. 4, 2023, which claims the benefit of U.S. provisional patent application No. 63/348,897, filed Jun. 3, 2022, which are hereby incorporated by reference herein in their entireties.

BACKGROUND

This disclosure relates generally to electronic devices and, more particularly, to electronic devices with displays that display virtual objects.

Some electronic devices include displays that present images close to a user's eyes. For example, extended reality headsets may include displays with optical elements that allow users to view images from the displays.

Devices such as these can be challenging to design. If care is not taken, viewing images from the displays may be less comfortable than desired to a user.

SUMMARY

An electronic device may include one or more sensors, one or more displays, one or more processors, and memory storing instructions configured to be executed by the one or more processors. The instructions may include instructions for receiving a request to display a virtual object and, in accordance with a determination that the virtual object is a first type of virtual object that has a location defined relative to a location corresponding to the electronic device or a user of the electronic device, determining, via the one or more sensors, a depth of a physical object, determining an apparent depth at which to display the virtual object based on at least the depth of the physical object, and displaying, via the one or more displays, the virtual object at the apparent depth.

DETAILED DESCRIPTION

Figure 1:
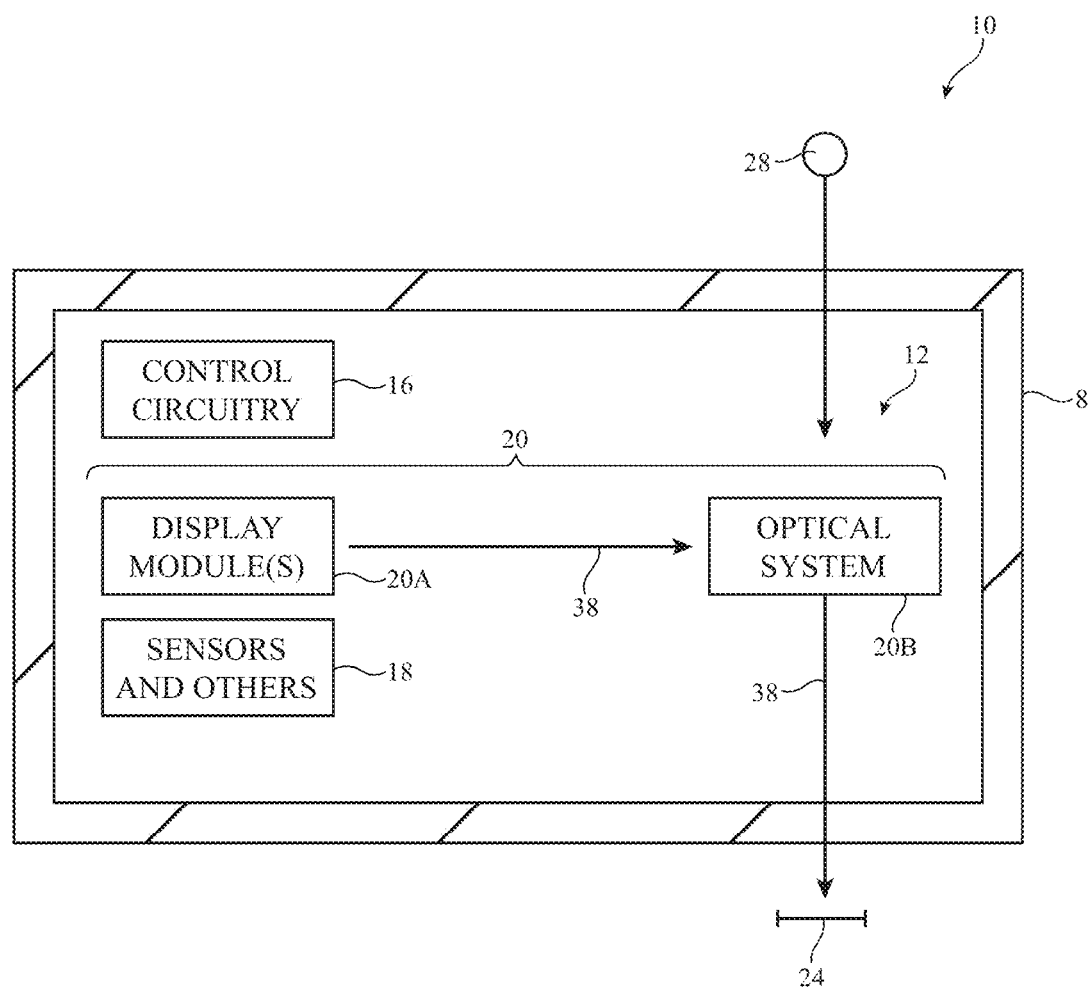
FIG. 1 is a diagram of an illustrative system having a display in accordance with some embodiments.

Head-mounted devices may display different types of extended reality content for a user. The head-mounted device may display a virtual object that is perceived at an apparent depth within the physical environment of the user. Virtual objects may sometimes be displayed at fixed locations relative to the physical environment of the user. For example, consider an example where a user's physical environment includes a table. A virtual object may be displayed for the user such that the virtual object appears to be resting on the table. As the user moves their head and otherwise interacts with the XR environment, the virtual object remains at the same, fixed position on the table (e.g., as if the virtual object were another physical object in the XR environment). This type of content may be referred to as world-locked content (because the position of the virtual object is fixed relative to the physical environment of the user).

Other virtual objects may be displayed at locations that are defined relative to the head-mounted device or a user of the head-mounted device. First, consider the example of virtual objects that are displayed at locations that are defined relative to the head-mounted device. As the head-mounted device moves (e.g., with the rotation of the user's head), the virtual object remains in a fixed position relative to the head-mounted device. For example, the virtual object may be displayed in the front and center of the head-mounted device (e.g., in the center of the device's or user's field-of-view) at a particular distance. As the user moves their head left and right, their view of their physical environment changes accordingly. However, the virtual object may remain fixed in the center of the device's or user's field of view at the particular distance as the user moves their head (assuming gaze direction remains constant). This type of content may be referred to as head-locked content. The head-locked content is fixed in a given position relative to the head-mounted device (and therefore the user's head which is supporting the head-mounted device). The head-locked content may not be adjusted based on a user's gaze direction. In other words, if the user's head position remains constant and their gaze is directed away from the head-locked content, the head-locked content will remain in the same apparent position.

Second, consider the example of virtual objects that are displayed at locations that are defined relative to a portion of the user of the head-mounted device (e.g., relative to the user's torso). This type of content may be referred to as body-locked content. For example, a virtual object may be displayed in front and to the left of a user's body (e.g., at a location defined by a distance and an angular offset from a forward-facing direction of the user's torso), regardless of which direction the user's head is facing. If the user's body is facing a first direction, the virtual object will be displayed in front and to the left of the user's body. While facing the first direction, the virtual object may remain at the same, fixed position relative to the user's body in the XR environment despite the user rotating their head left and right (to look towards and away from the virtual object). However, the virtual object may move within the device's or user's field of view in response to the user rotating their head. If the user turns around and their body faces a second direction that is the opposite of the first direction, the virtual object will be repositioned within the XR environment such that it is still displayed in front and to the left of the user's body. While facing the second direction, the virtual object may remain at the same, fixed position relative to the user's body in the XR environment despite the user rotating their head left and right (to look towards and away from the virtual object).

In the aforementioned example, body-locked content is displayed at a fixed position/orientation relative to the user's body even as the user's body rotates. For example, the virtual object may be displayed at a fixed distance in front of the user's body. If the user is facing north, the virtual object is in front of the user's body (to the north) by the fixed distance. If the user rotates and is facing south, the virtual object is in front of the user's body (to the south) by the fixed distance.

Alternatively, the distance offset between the body-locked content and the user may be fixed relative to the user whereas the orientation of the body-locked content may remain fixed relative to the physical environment. For example, the virtual object may be displayed in front of the user's body at a fixed distance from the user as the user faces north. If the user rotates and is facing south, the virtual object remains to the north of the user's body at the fixed distance from the user's body.

Body-locked content may also be configured to always remain gravity or horizon aligned, such that head and/or body changes in the roll orientation would not cause the body-locked content to move within the XR environment. Translational movement may cause the body-locked content to be repositioned within the XR environment to maintain the fixed distance from the user. Subsequent descriptions of body-locked content may include both of the aforementioned types of body-locked content.

To improve user comfort in certain scenarios, head-locked and/or body-locked content may be displayed at an apparent depth that matches the depth of an object (e.g., a virtual or physical object) in an XR environment. The head-mounted device may include one or more sensors that determine the depth of a physical object in a physical environment. Based at least on the depth of the object, the head-mounted device may determine an apparent depth for the virtual object and display the virtual object at the apparent depth. The apparent depth of the virtual object may be repeatedly updated to continuously match the depths of objects in the XR environment.

System 10 of FIG. 1 may be a head-mounted device having one or more displays. The displays in system 10 may include displays 20 (sometimes referred to as near-eye displays) mounted within support structure (housing) 8. Support structure 8 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display modules such as display modules 20A and one or more optical systems such as optical systems 20B. Display modules 20A may be mounted in a support structure such as support structure 8. Each display module 20A may emit light 38 (image light) that is redirected towards a user's eyes at eye box 24 using an associated one of optical systems 20B.

The operation of system 10 may be controlled using control circuitry 16. Control circuitry 16 may be configured to perform operations in system 10 using hardware (e.g., dedicated hardware or circuitry), firmware and/or software. Software code for performing operations in system 10 and other data is stored on non-transitory computer readable storage media (e.g., tangible computer readable storage media) in control circuitry 16. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16. The processing circuitry may include application-specific integrated circuits with processing circuitry, one or more microprocessors, digital signal processors, graphics processing units, a central processing unit (CPU) or other processing circuitry.

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world objects that are optionally digitally merged with virtual objects on a display in system 10, accelerometers, depth sensors, light sensors, haptic output devices, speakers, batteries, wireless communications circuits for communicating between system 10 and external electronic equipment, etc.).

Display modules 20A may be liquid crystal displays, organic light-emitting diode displays, laser-based displays, or displays of other types. Optical systems 20B may form lenses that allow a viewer (see, e.g., a viewer's eyes at eye box 24) to view images on display(s) 20. There may be two optical systems 20B (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 20B may be selected so that any gap present between the displays will not be visible to a user (e.g., so that the images of the left and right displays overlap or merge seamlessly).

If desired, optical system 20B may contain components (e.g., an optical combiner, etc.) to allow real-world image light from real-world images or objects 28 to be combined optically with virtual (computer-generated) images such as virtual images in image light 38. In this type of system, a user of system 10 may view both real-world content and computer-generated content that is overlaid on top of the real-world content. Camera-based systems may also be used in device 10 (e.g., in an arrangement in which a camera captures real-world images of object 28 and this content is digitally merged with virtual content at optical system 20B).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2A:
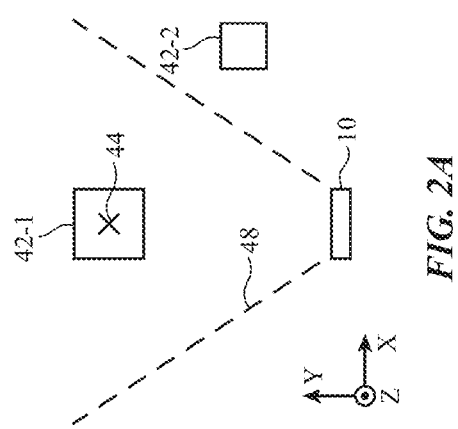
FIGS. 2A-2C are top views of an extended reality (XR) environment including a head-mounted device, physical objects, and a world-locked virtual object in accordance with some embodiments.
Figure 2B:
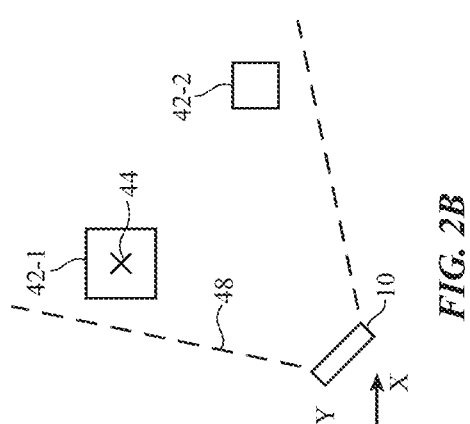
Figure 2C:
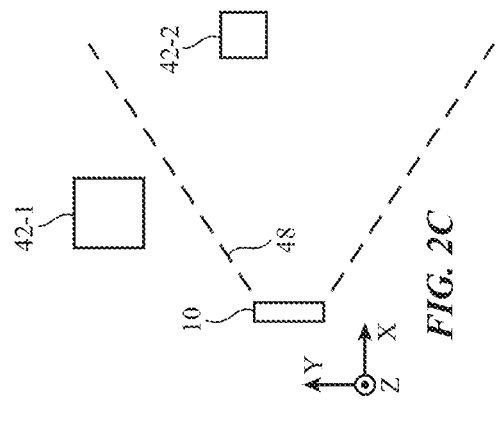
Figure 3A:
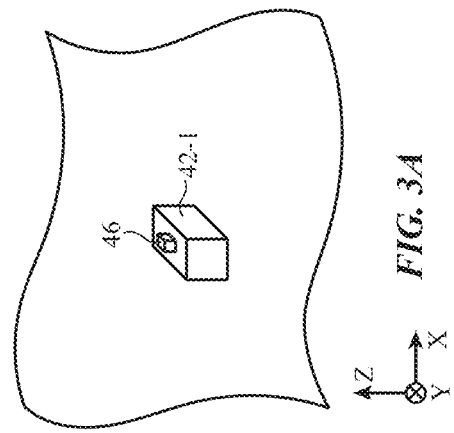
FIG. 3A is a depiction of a user's view of the XR environment of FIG. 2A in accordance with some embodiments.
Figure 3B:
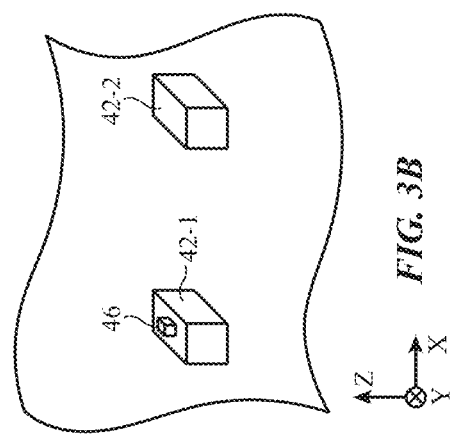
FIG. 3B is a depiction of a user's view of the XR environment of FIG. 2B in accordance with some embodiments.
Figure 3C:
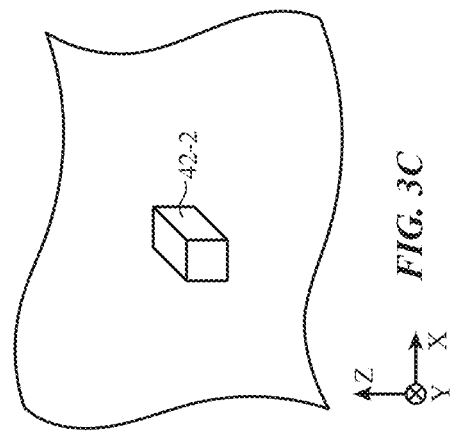
FIG. 3C is a depiction of a user's view of the XR environment of FIG. 2C in accordance with some embodiments.

FIGS. 2A-2C and FIGS. 3A-3C show examples of world-locked content. FIGS. 2A-2C are top views of an XR environment including head-mounted device 10, physical object 42-1, and physical object 42-2. FIG. 3A is a depiction of a user's view of the XR environment of FIG. 2A while wearing head-mounted device 10. FIG. 3B is a depiction of a user's view of the XR environment of FIG. 2B while wearing head-mounted device 10. FIG. 3C is a depiction of a user's view of the XR environment of FIG. 2C while wearing head-mounted device 10. Dashed lines 48 in FIGS. 2A-2C show the field-of-view of a user wearing head-mounted device 10.

In FIG. 2A, the field-of-view of the user operating head-mounted device 10 includes physical object 42-1 but not physical object 42-2. Accordingly, physical object 42-1 is visible in the view of FIG. 3A while physical object 42-2 is not. FIG. 2A also shows the apparent location 44 for a world-locked virtual object that is displayed in the XR environment. The apparent location 44 overlaps the physical object 42-1. As shown in the corresponding view of FIG. 3A, the virtual object 46 appears to be positioned on an upper surface of physical object 42-1. In FIGS. 3A-3C, virtual object 46 is depicted as a three-dimensional object (e.g., simulating a physical object such as a cube). This example is merely illustrative. Virtual object 46 in FIGS. 3A-3C may instead be a two-dimensional object (e.g., text).

Because the virtual object in FIGS. 2A-2C and FIGS. 3A-3C is a world-locked virtual object, the virtual object remains in a fixed position relative to physical objects 42-1 and 42-2 as the user moves their head. In FIG. 2B, the user has rotated their head to the right, causing the position of head-mounted device 10 to change. Physical objects 42-1 and 42-2 are now both in the user's field-of-view. Accordingly, physical objects 42-1 and 42-2 are both visible in the view of FIG. 3B. The apparent location 44 of the virtual object remains the same relative to physical objects 42-1 and 42-2 (overlapping the physical object 42-1). As shown in the corresponding view of FIG. 3B, the virtual object 46 therefore still appears to be positioned on an upper surface of physical object 42-1 (even though the user's head has rotated).

In FIG. 2C, the user has rotated their head even further to the right. In this position, physical object 42-2 is visible in the view of FIG. 3C while physical object 42-1 is not. Accordingly, the virtual object 46 is no longer in the field-of-view and is no longer displayed.

Figure 4A:
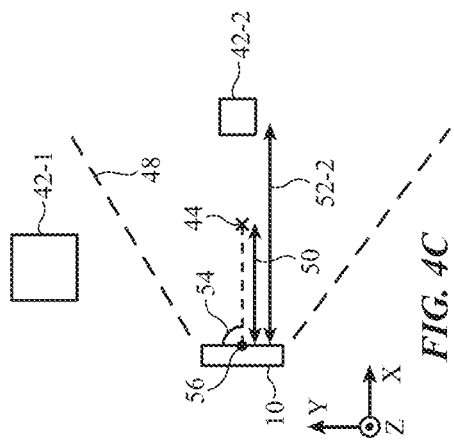
FIGS. 4A-4C are top views of an XR environment including a head-mounted device, physical objects, and a head-locked virtual object at a fixed distance from the head-mounted device in accordance with some embodiments.
Figure 4B:
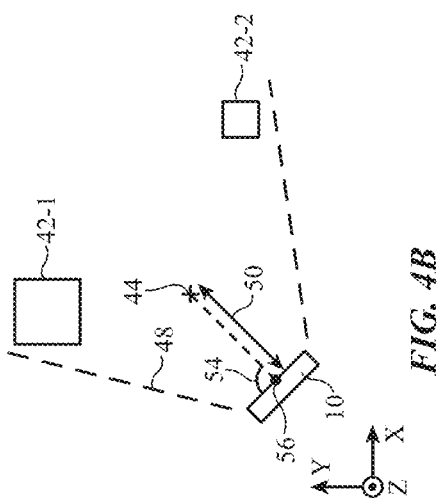
Figure 4C:
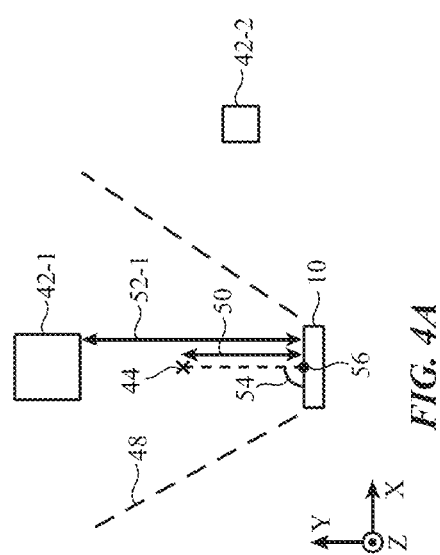
Figure 5A:
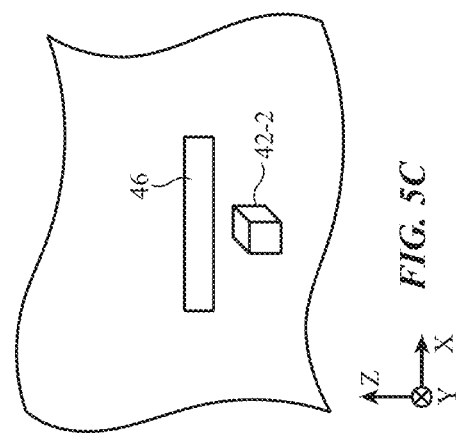
FIG. 5A is a depiction of a user's view of the XR environment of FIG. 4A in accordance with some embodiments.
Figure 5B:
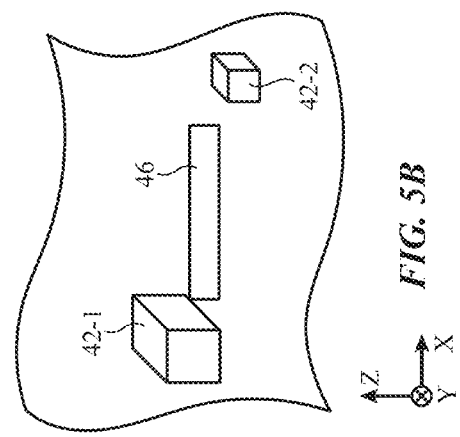
FIG. 5B is a depiction of a user's view of the XR environment of FIG. 4B in accordance with some embodiments.
Figure 5C:
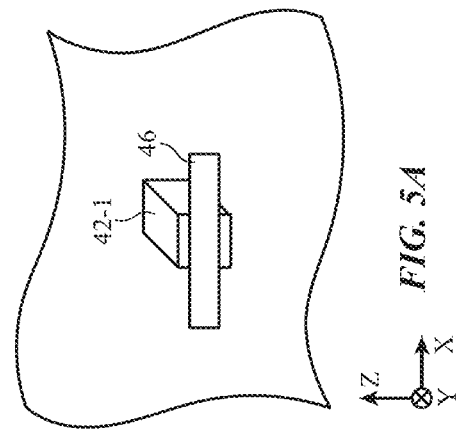
FIG. 5C is a depiction of a user's view of the XR environment of FIG. 4C in accordance with some embodiments.

FIGS. 4A-4C and FIGS. 5A-5C show examples of head-locked content. FIGS. 4A-4C are top views of an XR environment including head-mounted device 10, physical object 42-1, and physical object 42-2. FIG. 5A is a depiction of a user's view of the XR environment of FIG. 4A while wearing head-mounted device 10. FIG. 5B is a depiction of a user's view of the XR environment of FIG. 4B while wearing head-mounted device 10. FIG. 5C is a depiction of a user's view of the XR environment of FIG. 4C while wearing head-mounted device 10. Dashed lines 48 in FIGS. 4A-4C show the field-of-view of a user wearing head-mounted device 10.

As shown in FIG. 4A, the field-of-view of the user operating head-mounted device 10 includes physical object 42-1 but not physical object 42-2. Accordingly, physical object 42-1 is visible in the view of FIG. 5A while physical object 42-2 is not. FIG. 5A also shows the apparent location 44 for a head-locked virtual object that is displayed in the XR environment. In FIGS. 5A-5C, virtual object 46 is depicted as a two-dimensional object. This example is merely illustrative. Virtual object 46 in FIGS. 5A-5C may instead be a three-dimensional object.

In FIG. 4A, apparent location 44 is at a depth 50 and angle 54 relative to device 10 (e.g., a front surface of device 10). Specifically, depth 50 and angle 54 may be measured relative to a reference point 56 on head-mounted device 10. The reference point 56 may be aligned with the center of head-mounted device 10 or any other desired portion of the head-mounted device 10. In FIG. 4A, angle 54 is 90 degrees such that the apparent location 44 of the virtual object is set directly in front of the head-mounted device 10. Accordingly, as shown in the corresponding view of FIG. 5A, the virtual object 46 appears in the center of the user's field-of-view (at a closer depth than physical object 42-1).

In FIGS. 4A-4C, depth 50 and angle 54 are fixed. Because the virtual object in FIGS. 4A-4C and FIGS. 5A-5C is a head-locked virtual object, the virtual object remains in a fixed position relative to head-mounted device 10 as the user moves their head. In FIG. 4B, the user has rotated their head to the right, causing the pose of head-mounted device 10 to change. Accordingly, physical objects 42-1 and 42-2 are now both in the user's field-of-view. Physical objects 42-1 and 42-2 are therefore both visible in the view of FIG. 5B. However, the apparent location 44 of the virtual object remains the same relative to head-mounted device 10 (e.g., in the center of the user's field-of-view as shown in FIG. 5B). The magnitude of depth 50 and angle 54 for apparent location 44 in FIG. 4B is the same as in FIG. 4A.

In FIG. 4C, the user has rotated their head further to the right, causing the pose of head-mounted device 10 to change. Accordingly, physical object 42-1 is no longer visible while physical object 42-2 remains visible. Physical object 42-2 is therefore visible in the view of FIG. 5C. However, the apparent location 44 of the virtual object remains the same relative to head-mounted device 10 (e.g., in the center of the user's field-of-view as shown in FIG. 5C). The magnitude of depth 50 and angle 54 for apparent location 44 in FIG. 4C is the same as in FIGS. 4A and 4B.

In FIGS. 4A-4C, depth 50 of apparent location 44 is fixed. It should be noted that, herein, depth refers to the lateral separation between the head-mounted device and a location (e.g., a location of a physical object or a virtual object) in the XR environment. The separation between the head-mounted device and an object may also have a vertical component in addition to this lateral component (depth). The total distance between the head-mounted device and the object may be a function of the lateral separation (depth) and the vertical separation. Trigonometry may be used to characterize the relationship between total distance, lateral separation, and vertical separation, with the total distance defining the hypotenuse of a right triangle and the lateral separation and vertical separation defining the remaining two sides of the right triangle. Therefore, any one of total distance, lateral separation, and vertical separation may be calculated based on known values for the remaining two of total distance, lateral separation, and vertical separation.

In FIGS. 4A-4C, as the user rotates their head, virtual object 46 remains at the same apparent location with the same apparent depth relative to the head-mounted device. As shown in FIG. 4A, the apparent depth 50 is less than the depth 52-1 of physical object 42-1. As shown in FIG. 4C, the apparent depth 50 is less than the depth 52-2 of physical object 42-2. This mismatch in depths between the virtual object and the physical objects may result in double vision of either the virtual object or the physical object. If the viewer focuses their eyes on a focal plane including the virtual object, the physical object will be out of focus to the viewer (resulting in double vision of the physical object). If the viewer focuses their eyes on a focal plane including the physical object, the virtual object will be out of focus to the viewer (resulting in double vision of the virtual object).

Figure 6C:
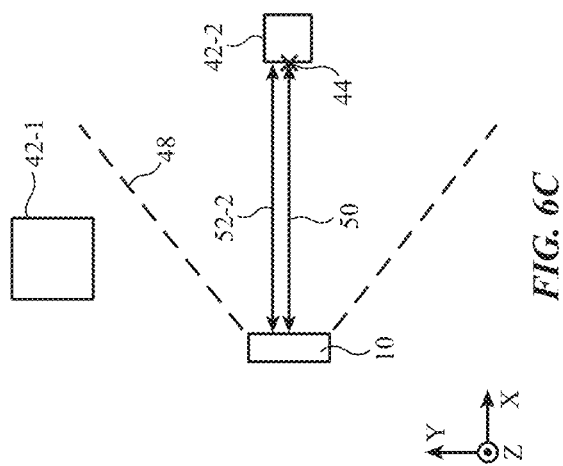
FIGS. 6A-6C are top views of an XR environment including a head-mounted device, physical objects, and a head-locked virtual object at a varying distance from the head-mounted device in accordance with some embodiments.
Figure 6B:
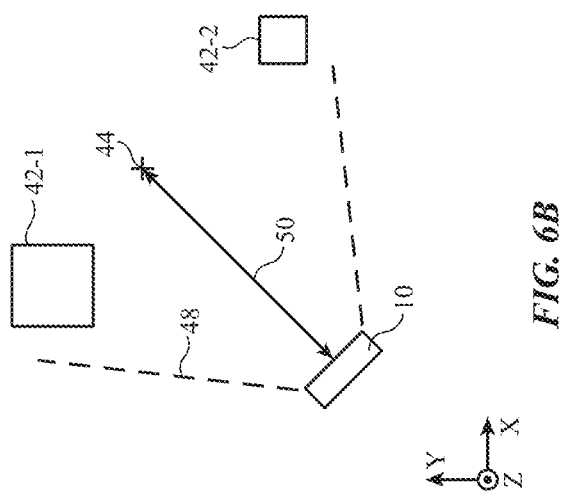
Figure 6A:
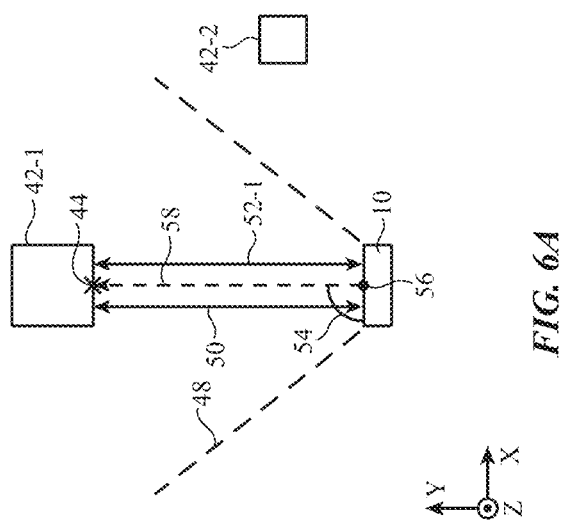

To improve user comfort when viewing head-locked content, the head-locked content may have an apparent depth that matches the depth of a physical object aligned with the head-locked content. FIGS. 6A-6C are top views of an XR environment including head-mounted device 10, physical object 42-1, and physical object 42-2. FIGS. 6A-6C show examples of head-locked content with an apparent depth that varies based on the distance between the head-mounted device and physical objects in the XR environment. Dashed lines 48 in FIGS. 6A-6C show the field-of-view of a user wearing head-mounted device 10.

A sensor 18 (see FIG. 1) within head-mounted device 10 may determine the depth of a physical object that is aligned with the direction of apparent location 44. For example, in FIG. 6A, a sensor may determine the depth 52-1 of physical object 42-1. Physical object 42-1 may be the closest physical object aligned with the angle 54 of apparent location 44. In other words, a line 58 is extrapolated from reference point 56 in a given direction dictated by angle 54. The first physical object to be hit by line 58 is aligned with the display direction of the virtual object. Sensor 18 in head-mounted device 10 may, based on a known display direction for the virtual object, determine the depth of the closest physical object. In FIG. 6A, the sensor determines the depth of physical object 42-1. The apparent location 44 of the virtual object is then set to have an apparent depth 50 that matches the depth 52-1 of physical object 42-1.

The example of apparent depth 50 being set to match the depth 52-1 of physical object 42-1 is merely illustrative. The apparent depth may have a default depth (such as a maximum allowable depth) that is adjusted if the apparent depth is greater than the distance to the nearest physical object.

Additionally, apparent depth 50 may be set to match the depth of other virtual objects in the XR environment. For example, a world-locked virtual object may be present in the XR environment at an apparent depth. Apparent depth 50 may sometimes be set to have an apparent depth that matches the apparent depth of the world-locked virtual object. In this case, the sensor is not required to determine the depth of the world-locked virtual object (since this object is displayed by the head-mounted device and therefore the depth of the world-locked virtual object is known by the head-mounted device). However, the adjustments of the apparent depth for a head-locked (or body-locked) virtual object may otherwise be the same when aligned with another virtual object as when aligned with a physical object.

The user's view of the XR environment of FIG. 6A while wearing head-mounted device 10 may be similar to that shown in FIG. 5A, with the apparent depth of virtual object 46 matching the depth of physical object 42-1.

The angle 54 that characterizes the apparent location 44 of the virtual object remains fixed as the user moves their head. However, the depth 50 that characterizes the apparent location 44 of the virtual object may be updated based on the depth of the closest physical object aligned with the virtual object.

In FIG. 6B, the user has rotated their head to the right, causing the pose of head-mounted device 10 to change. Accordingly, physical objects 42-1 and 42-2 are now both in the user's field-of-view. However, neither physical object 42-1 nor physical object 42-2 is aligned with the apparent location 44. In this case, the apparent depth 50 of the virtual object may remain unchanged (e.g., stay the same as in FIG. 6A) or may revert to a predetermined magnitude (e.g., a maximum comfortable apparent depth). The user's view of the XR environment of FIG. 6B while wearing head-mounted device 10 may be similar to that shown in FIG. 5B.

In FIG. 6C, the user has rotated their head further to the right, causing the pose of head-mounted device 10 to change. Accordingly, physical object 42-1 is no longer visible while physical object 42-2 remains visible. Sensor 18 in head-mounted device 10 may, based on a known display direction for the virtual object, determine that physical object 42-2 is the closest physical object. The sensor determines the depth of physical object 42-2. The apparent location 44 of the virtual object is then set to have an apparent depth 50 that matches the depth 52-2 of physical object 42-2. Depth 52-2 of physical object 42-2 is less than depth 52-1 of physical object 42-1. By adjusting depth 50 in FIG. 6C to match depth 52-2, a mismatch between the depths is avoided.

In some situations, the depth of a closest physical (or virtual) object may be used to adjust the apparent depth of a virtual object even when there is no overlap between the virtual object and the closest physical (or virtual) object. For example, if the closest physical (or virtual) object is within a threshold distance or angle of the virtual object, the apparent depth of the virtual object may be set to equal the depth of the closest physical (or virtual) object. This may enable a viewer to easily look from one to the other.

The user's view of the XR environment of FIG. 6C while wearing head-mounted device 10 may be similar to that shown in FIG. 5C, with the apparent depth of virtual object 46 matching the depth of physical object 42-2.

By adjusting the depth of the head-locked content to match the depth of physical objects in the XR environment, the user may have improved comfort when viewing the head-locked content.

Head-locked content is explicitly described in connection with FIGS. 4A-4C, FIGS. 5A-5C, and FIGS. 6A-6C. However, it should be understood that these same descriptions also apply to body-locked content. For body-locked content, the apparent location may be adjusted in a similar manner as the head-locked content (with an apparent depth that is adjusted to match the depth of the closest physical object). However, the apparent location for the body-locked content is defined relative to a reference point on the user's body instead of on the head-mounted device itself.

One or more sensors 18 in head-mounted device 10 may be configured to determine the depth of physical objects in the XR environment. The one or more sensors 18 may include an image sensor with an array of imaging pixels (e.g., that sense red, blue, and green visible light) that is configured to capture images of the user's physical environment. Machine learning algorithms may be applied to the captured images from the image sensor to determine the depth of various physical objects in the physical environment. As another example, the one or more sensors may include gaze detection sensors. The gaze detection sensors may be able to determine the degree of convergence of a user's eyes. High convergence may be indicative of a physical object that is close to the user (e.g., a short depth) whereas low convergence may be indicative of a physical object that is far away from the user (e.g., a far depth). The convergence determined by the gaze detection sensor(s) my therefore be used to estimate the depth of physical objects in the physical environment. As another example, the one or more sensors may include a stereo camera (with two or more lenses and image sensors for capturing three-dimensional images). As yet another example, the one or more sensors may include a depth sensor. The depth sensor may be a pixelated depth sensor (e.g., that is configured to measure multiple depths across the physical environment) or a point sensor (that is configured to measure a single depth in the physical environment). When a point sensor is used, the point sensor may be aligned with the known display direction of the head-locked content in head-mounted device 10. For example, in FIGS. 6A-6C, the head-locked content is always aligned with line 58 that is at angle 54 relative to head-mounted device 10. The point sensor may therefore measure depth along line 58 to determine the depth of the closest physical object aligned with the virtual object. The depth sensor (whether a pixelated depth sensor or a point sensor) may use phase detection (e.g., phase detection autofocus pixel(s)) or light detection and ranging (LIDAR). Any subset of these types of sensors may be used in combination to determine the depth of physical objects in the physical environment.

Figure 8:
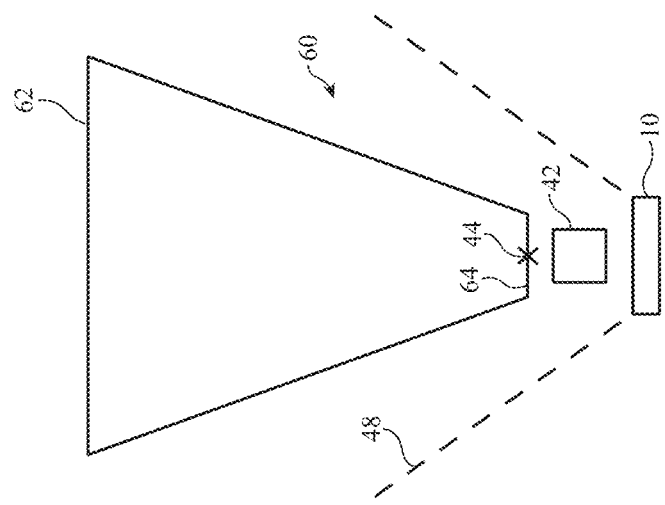
FIG. 8 is a top view of an XR environment with a virtual object at an apparent depth that is equal to a minimum allowable apparent depth in accordance with some embodiments.
Figure 7:
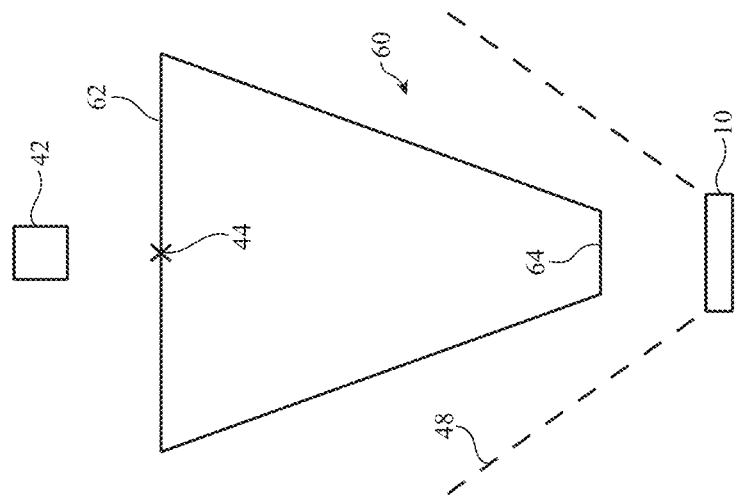
FIG. 7 is a top view of an XR environment with a virtual object at an apparent depth that is equal to a maximum allowable apparent depth in accordance with some embodiments.

The optical system 20B in head-mounted device 10 may have an associated target viewing zone for virtual objects displayed using the head-mounted device. The user may view virtual objects with an acceptable level of comfort when the virtual objects are displayed within the target viewing zone. FIGS. 7 and 8 are top views of illustrative XR environments showing the target viewing zone 60. As shown in FIGS. 7 and 8, the target viewing zone has a maximum comfortable apparent depth 62 and a minimum comfortable apparent depth 64. In some cases, head-mounted device 10 may only display virtual objects within target viewing zone 60. Accordingly, maximum comfortable apparent depth 62 may sometimes be referred to as maximum allowable apparent depth 62 and minimum comfortable apparent depth 64 may sometimes be referred to as minimum allowable apparent depth 64.

In the example of FIG. 7, a physical object 42 in the XR environment has a depth that is greater than the maximum allowable apparent depth 62. In this case, the apparent location 44 of a head-locked or body-locked virtual object in the XR environment may be set to have a depth that is equal to the maximum allowable apparent depth 62. In other examples, the apparent location 44 of the head-locked or body-locked virtual object in the XR environment may be set to have a depth that is equal to the maximum allowable apparent depth 62, the minimum allowable apparent depth 64, or any value in between. In the example of FIG. 8, a physical object 42 in the XR environment has a depth that is less than the minimum allowable apparent depth 64. In this case, the apparent location 44 of a head-locked or body-locked virtual object in the XR environment may be set to have a depth that is equal the minimum allowable apparent depth 64. In other examples, the apparent location 44 of the head-locked or body-locked virtual object in the XR environment may be set to have a depth that is equal to the maximum allowable apparent depth 62, the minimum allowable apparent depth 64, or any value in between.

In the example of FIGS. 7 and 8, the virtual object is anchored to the minimum or maximum allowable apparent depth of target viewing zone 60 when a physical object aligned with the virtual object has a depth outside the target viewing zone. This example is merely illustrative. Instead or in addition, the virtual object may be modified (adjusted) when a physical object aligned with the virtual object has a depth outside the target viewing zone. Consider the example of FIG. 8. Displaying a virtual object at apparent location 44 may cause the viewer discomfort (because the virtual object will appear to be 'inside' the physical object 42). To mitigate viewer discomfort in this type of scenario, the virtual object may be adjusted. Possible adjustments include changing the size of the virtual object (e.g., making the virtual object smaller), changing the opacity of the virtual object (e.g., fading out the virtual object), displaying a warning or other discomfort indicator (e.g., a red dot, warning text, etc.) instead of or in addition to the virtual object, applying a visual effect (e.g., a blur, feathering, mask, etc.) to the edges of or surrounding the virtual object, etc.

As shown and discussed in connection with FIGS. 6A-6C, the apparent depth of a head-locked or body-locked virtual object may be adjusted to match the depth of an object aligned with the virtual object. This results in real-time changes to the apparent depth of the virtual object as the user rotates their head and aligns the virtual content with objects at varying depths. To ensure a seamless experience for the user when viewing virtual content at varying depths, the size of the virtual content on display 20 in head-mounted device 10 may be updated such that the apparent size (e.g., size of the object in screen space or amount of screen occupied by the object) of the virtual content when viewed by the user remains constant.

In addition to maintaining a constant apparent size with varying apparent depths, the alignment of the images used to display the virtual object may be adjusted with varying apparent depths. First and second displays may display first and second images that are viewed by first and second eyes of the user to perceive the virtual object. At closer apparent depths, the first and second images may be separated by a smaller distance than at farther apparent depths.

Changes to the apparent depth and/or alignment of the images used to display the virtual object may be performed gradually across a transition period. This transition period may simulate the performance of the human eye and produce a more natural viewing experience for the user. The transition period may have a duration of at least 5 milliseconds, at least 50 milliseconds, at least 100 milliseconds, at least 200 milliseconds, at least 300 milliseconds, at least 500 milliseconds, less than 500 milliseconds, less than 1 second, less than 300 milliseconds, between 200 milliseconds and 400 milliseconds, between 250 milliseconds and 350 milliseconds, between 50 milliseconds and 1 second, etc. The alignment and/or apparent depth of the virtual object may change gradually throughout the transition period.

Figure 9:
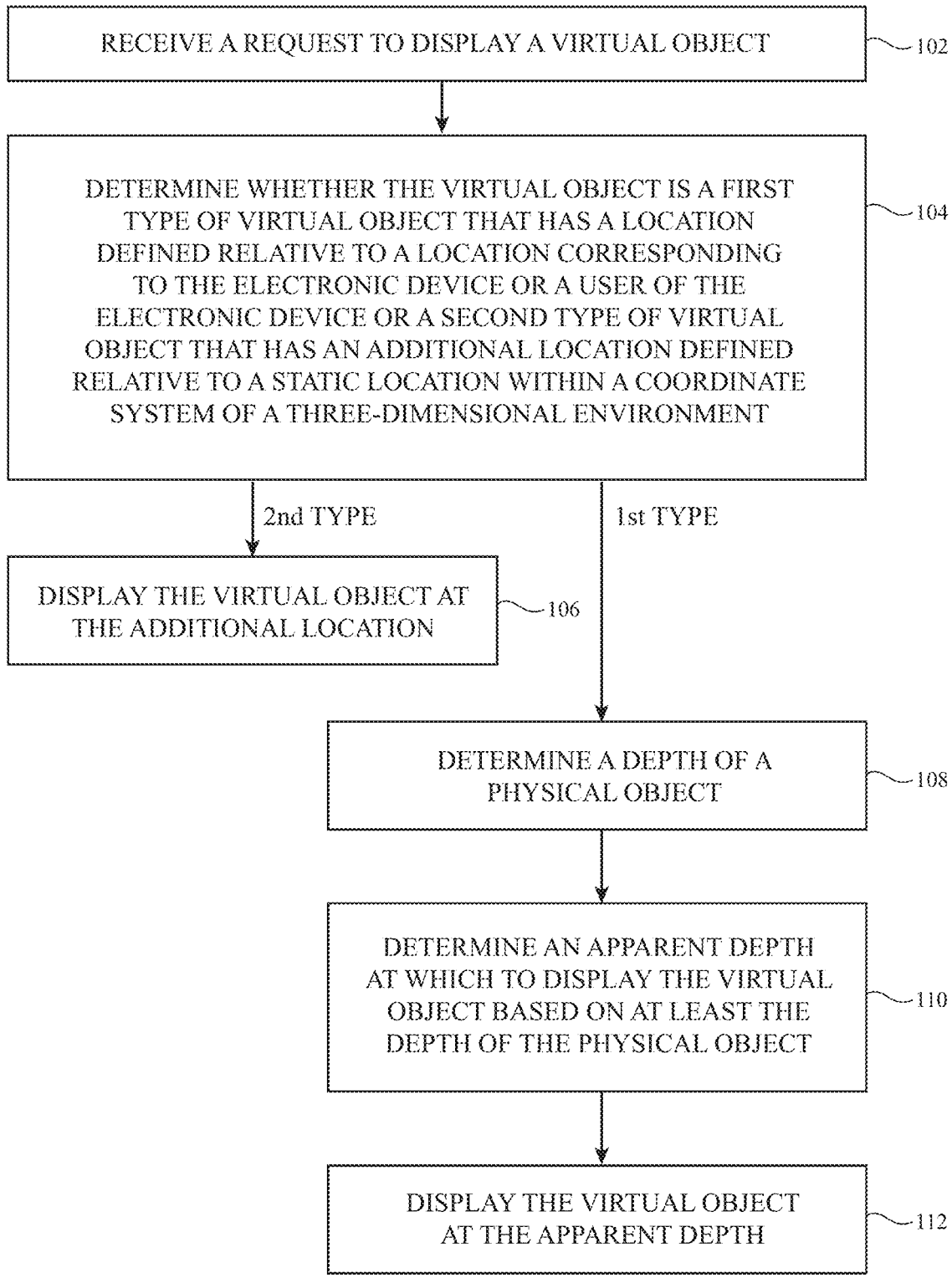
FIG. 9 is a flowchart of an illustrative method performed by an electronic device in accordance with some embodiments.

FIG. 9 is a flowchart showing an illustrative method performed by an electronic device (e.g., control circuitry 16 in device 10). The blocks of FIG. 9 may be stored as instructions in memory of electronic device 10, with the instructions configured to be executed by one or more processors in the electronic device.

At block 102, the control circuitry may receive a request to display a virtual object. The virtual object may be a two-dimensional virtual object or a three-dimensional virtual object. The virtual object may be a world-locked virtual object (where the position of the virtual object is fixed relative to the physical environment of the user), a head-locked virtual object (where the virtual object remains in a fixed position relative to the head-mounted device when the head-mounted device moves), or a body-locked virtual object (where the virtual object remains in a fixed position relative to a portion of the user of the head-mounted device). As specific examples, the virtual object may be a notification to the user that includes text. This type of virtual object may be a head-locked virtual object. The virtual object may alternatively be a simulation of a physical object such as a cube. This type of virtual object may be a world-locked virtual object. At block 104, the control circuitry may determine if the virtual object is a first type of virtual object that has a location defined relative to a location corresponding to the electronic device (e.g., head-locked content) or a user of the electronic device (e.g., body-locked content) or if the virtual object is a second type of virtual object that has a location defined relative to a static location within a coordinate system of a three-dimensional environment (e.g., world-locked content). For example, the control circuitry may receive a request to display a user notification that includes text. The control circuitry may determine that this virtual object is the first type of virtual object (e.g., a head-locked virtual object). Alternatively, the control circuitry may receive a request to display a simulation of the cube and determine that the virtual object is the second type of virtual object (e.g., a world-locked virtual object). The three-dimensional environment with the coordinate system may be an XR environment that represents a virtual environment or the physical environment surrounding the user of the head-mounted device.

In response to determining that the virtual object is the second type of virtual object (e.g., a world-locked virtual object), the method may proceed to block 106. At block 106, the virtual object may be displayed (e.g., using display 20) using the location as the apparent location for the virtual object. The world-locked virtual object may remain fixed at the location relative to the three-dimensional environment as the user moves their head, body, and/or gaze. For example, the simulation of the cube (discussed above) may be displayed at a fixed location relative to the physical environment (e.g., on a table) as the user moves their head.

In response to determining that the virtual object is the first type of virtual object (e.g., a head-locked virtual object or a body-locked virtual object), the method may proceed to block 108. At block 108, control circuitry 16 may use at least one sensor 18 to determine a depth of a physical object in the physical environment of the user. The at least one sensor may include a camera configured to capture images of surroundings of the electronic device (that are subsequently analyzed by the control circuitry to determine the depth of the physical object), a LIDAR sensor, a depth sensor, and/or a stereo camera. The physical object may be the nearest physical object to the electronic device in a given direction relative to the electronic device. The virtual object may be displayed at an apparent depth corresponding to the determined depth and in the given direction relative to the electronic device. In other words, the sensor is configured to determine the depth of the closest physical object that is aligned with the intended display direction of the virtual object. For example, consider the example above where the virtual object is a user notification that includes text. The sensor may determine the depth of a nearest physical object (e.g., a wall) to the head-mounted device that is aligned with the user notification.

The example in block 108 of determining the depth to a nearest physical object is merely illustrative. As previously mentioned, the control circuitry may determine the depth of the nearest object in the XR environment, whether the nearest object is a physical object (e.g., a wall as mentioned above) or a virtual object (e.g., a simulation of a three-dimensional object).

In some examples, at block 108, the depth of a physical or virtual object may only be relied upon if the object is determined to satisfy one or more criteria, such as the object being larger than a threshold size, the object occupying a threshold field of view of the user or electronic device, the object being a particular type of object (e.g., a wall, display of an electronic device, etc.), or the like. The size of the object may be determined using known properties of the object, a depth sensor, a camera in system 10, or any other desired sensor(s). In other words, the control circuitry 16 may determine the depth of the closest object that is both aligned with the intended display direction of the virtual object and that is larger than a threshold size. For example, the depth sensor may detect a first physical object that is at a first depth. However, the first physical object may be smaller than the threshold size and therefore the first depth is not relied upon for subsequent processing. The depth sensor may also detect a second physical object that is at a second depth that is greater than the first depth. The second physical object may be larger than the threshold size and therefore the second depth is used for subsequent processing.

Next, at block 110, the control circuitry may determine an apparent depth at which to display the virtual object based on at least the depth of the physical object. The head-mounted device may have an associated minimum allowable apparent depth and maximum allowable apparent depth. When the depth of the physical object is greater than or equal to the minimum allowable apparent depth and less than or equal to the maximum allowable apparent depth, the apparent depth of the virtual object may be set to equal the depth of the physical object. When the depth of the physical object is greater than the maximum allowable apparent depth, the apparent depth of the virtual object may be set to equal the maximum allowable apparent depth. When the depth of the physical object is less than the minimum allowable apparent depth, the apparent depth of the virtual object may be set to equal the minimum allowable apparent depth. When the depth of the physical object is less than the minimum allowable apparent depth or greater than the maximum allowable apparent depth, the virtual object may be adjusted to mitigate viewer discomfort. Possible adjustments include changing the size of the virtual object (e.g., making the virtual object smaller), changing the opacity of the virtual object (e.g., fading out the virtual object), displaying a warning or other discomfort indicator (e.g., a red dot, warning text, etc.) instead of or in addition to the virtual object, applying a visual effect on or around the virtual object, etc.

Consider the example above where the nearest object to head-mounted device is a wall in the physical environment. If the depth of the wall is greater than or equal to the minimum allowable apparent depth and less than or equal to the maximum allowable apparent depth, the apparent depth of the user notification may be set to equal the depth of the wall. If the depth of the wall is greater than the maximum allowable apparent depth, the apparent depth of the user notification may be set to equal the maximum allowable apparent depth. When the depth of the wall is less than the minimum allowable apparent depth, the apparent depth of the user notification may be set to equal the minimum allowable apparent depth. When the depth of the wall is less than the minimum allowable apparent depth or greater than the maximum allowable apparent depth, the user notification may be adjusted to mitigate viewer discomfort. Possible adjustments include changing the size of the user notification (e.g., making the user notification smaller), changing the opacity of the user notification (e.g., fading out the user notification), displaying a warning or other discomfort indicator (e.g., a red dot, warning text, etc.) instead of or in addition to the user notification, applying a visual effect on or around the user notification, etc.

Generally, the display direction of head-locked and body-locked virtual objects is fixed (relative to the head-mounted device and user's body, respectively). However, there are some cases where the angle (e.g., angle 54) may be adjusted at block 110. Angle 54 may be adjusted to prevent the virtual object from overlapping two physical objects of varying depths. Consider a scenario where the left half of the virtual object overlaps a first physical object at a first depth and a right half of the virtual object overlaps a second physical object at a second depth that is different than the first depth. The angle may be shifted such that the virtual object entirely overlaps either the first physical object or the second physical object.

After determining the apparent location (including the apparent depth) at which to display the virtual object at block 110, the virtual object (e.g., the user notification discussed above) may be displayed at the apparent depth at block 112. Blocks 108-112 may be performed repeatedly for virtual objects of the first type. In this way, if the user rotates their head and the depth of the physical object aligned with the virtual object changes, the apparent depth of the virtual object may be continuously adjusted to match the depth of the aligned physical object. Blocks 108-112 (e.g., repeatedly determining the depth of the physical object and repeatedly determining the apparent depth) may be repeated at a frequency that is greater than 1 Hz, greater than 2 Hz, greater than 4 Hz, greater than 10 Hz, greater than 30 Hz, greater than 60 Hz, less than 60 Hz, less than 30 Hz, less than 10 Hz, less than 5 Hz, between 2 Hz and 10 Hz, etc.

Repeatedly determining the apparent depth may include changing the apparent depth from a first apparent depth to a second apparent depth that is greater than the first apparent depth. The apparent size of the virtual object may remain constant while the apparent depth changes.

The apparent depth and/or alignment of the virtual object may be updated gradually during a transition period. The transition period may have a duration of at least 200 milliseconds or another desired duration.

Out of an abundance of caution, it is noted that to the extent that any implementation of this technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device comprising:
   one or more sensors;
   one or more displays;
   one or more processors; and
   memory storing instructions configured to be executed by the one or more processors, the instructions for:
      receiving a request to display a virtual object; and
      in accordance with a determination that the virtual object is a first type of virtual object that has a location defined relative to a location corresponding to the electronic device or a user of the electronic device:
         determining, while the virtual object is displayed at a first apparent depth and using the one or more sensors, a second apparent depth at which to display the virtual object; and
         changing an apparent depth of the virtual object from the first apparent depth to the second apparent depth during a transition period.

2. The electronic device defined in claim 1, wherein the transition period is at least 50 milliseconds.

3. The electronic device defined in claim 1, wherein determining the second apparent depth at which to display the virtual object comprises:
   determining, via the one or more sensors, a depth of a physical object; and
   determining the second apparent depth based on at least the depth of the physical object.

4. The electronic device defined in claim 3, wherein determining, via the one or more sensors, the depth of the physical object comprises determining a depth of a nearest physical object to the electronic device in a given direction relative to the electronic device, and wherein changing the apparent depth of the virtual object from the first apparent depth to the second apparent depth comprises changing the apparent depth of the virtual object from the first apparent depth to the second apparent depth while the virtual object is displayed in the given direction relative to the electronic device.

5. The electronic device defined in claim 3, wherein determining, via the one or more sensors, the depth of the physical object comprises determining a depth of a nearest physical object to the electronic device in a given direction relative to the electronic device that satisfies a size criterion.

6. The electronic device defined in claim 1, wherein the one or more sensors comprises a sensor selected from the group consisting of: a light detection and ranging (LIDAR) sensor, a depth sensor, and a stereo camera.

7. The electronic device defined in claim 1, wherein the instructions further comprise instructions for:
   in accordance with a determination that the virtual object is a second type of virtual object that has an additional location defined relative to a static location within a coordinate system of a three-dimensional environment:
      displaying, via the one or more displays, the virtual object at the additional location.

8. A method of operating an electronic device that comprises one or more sensors and one or more displays, the method comprising:
   receiving a request to display a virtual object; and
   in accordance with a determination that the virtual object is a first type of virtual object that has a location defined relative to a location corresponding to the electronic device or a user of the electronic device:
  determining, while the virtual object is displayed at a first apparent depth and using the one or more sensors, a second apparent depth at which to display the virtual object; and
  changing an apparent depth of the virtual object from the first apparent depth to the second apparent depth during a transition period.

9. The method defined in claim 8, wherein the transition period is at least 50 milliseconds.

10. The method defined in claim 8, wherein determining the second apparent depth at which to display the virtual object comprises:
  determining, via the one or more sensors, a depth of a physical object; and
  determining the second apparent depth based on at least the depth of the physical object.

11. The method defined in claim 10, wherein determining, via the one or more sensors, the depth of the physical object comprises determining a depth of a nearest physical object to the electronic device in a given direction relative to the electronic device, and wherein changing the apparent depth of the virtual object from the first apparent depth to the second apparent depth comprises changing the apparent depth of the virtual object from the first apparent depth to the second apparent depth while the virtual object is displayed in the given direction relative to the electronic device.

12. The method defined in claim 10, wherein determining, via the one or more sensors, the depth of the physical object comprises determining a depth of a nearest physical object to the electronic device in a given direction relative to the electronic device that satisfies a size criterion.

13. The method defined in claim 8, wherein the one or more sensors comprises a sensor selected from the group consisting of: a light detection and ranging (LIDAR) sensor, a depth sensor, and a stereo camera.

14. The method defined in claim 8, further comprising:
  in accordance with a determination that the virtual object is a second type of virtual object that has an additional location defined relative to a static location within a coordinate system of a three-dimensional environment:
    displaying, via the one or more displays, the virtual object at the additional location.

15. A non-transitory computer-readable storage medium storing one or more programs configured to be executed by one or more processors of an electronic device that comprises one or more sensors and one or more displays, the one or more programs including instructions for:
  receiving a request to display a virtual object; and
  in accordance with a determination that the virtual object is a first type of virtual object that has a location defined relative to a location corresponding to the electronic device or a user of the electronic device:
    determining, while the virtual object is displayed at a first apparent depth and using the one or more sensors, a second apparent depth at which to display the virtual object; and
    changing an apparent depth of the virtual object from the first apparent depth to the second apparent depth during a transition period.

16. The non-transitory computer-readable storage medium defined in claim 15, wherein the transition period is at least 50 milliseconds.

17. The non-transitory computer-readable storage medium defined in claim 15, wherein determining the second apparent depth at which to display the virtual object comprises:
  determining, via the one or more sensors, a depth of a physical object; and
  determining the second apparent depth based on at least the depth of the physical object.

18. The non-transitory computer-readable storage medium defined in claim 17, wherein determining, via the one or more sensors, the depth of the physical object comprises determining a depth of a nearest physical object to the electronic device in a given direction relative to the electronic device, and wherein changing the apparent depth of the virtual object from the first apparent depth to the second apparent depth comprises changing the apparent depth of the virtual object from the first apparent depth to the second apparent depth while the virtual object is displayed in the given direction relative to the electronic device.

19. The non-transitory computer-readable storage medium defined in claim 17, wherein determining, via the one or more sensors, the depth of the physical object comprises determining a depth of a nearest physical object to the electronic device in a given direction relative to the electronic device that satisfies a size criterion.

20. The non-transitory computer-readable storage medium defined in claim 15, wherein the one or more sensors comprises a sensor selected from the group consisting of: a light detection and ranging (LIDAR) sensor, a depth sensor, and a stereo camera.

21. The non-transitory computer-readable storage medium defined in claim 15, wherein the instructions further comprise instructions for:
  in accordance with a determination that the virtual object is a second type of virtual object that has an additional location defined relative to a static location within a coordinate system of a three-dimensional environment:
    displaying, via the one or more displays, the virtual object at the additional location.

* * * * *